US012537067B2

(12) United States Patent
Wang et al.

(10) Patent No.: US 12,537,067 B2
(45) Date of Patent: Jan. 27, 2026

(54) METHOD OF OPERATING MEMORY, MEMORY, AND MEMORY SYSTEM

(71) Applicant: YANGTZE MEMORY TECHNOLOGIES CO., LTD., Wuhan (CN)

(72) Inventors: Junbao Wang, Wuhan (CN); Jianquan Jia, Wuhan (CN); Yuanyuan Min, Wuhan (CN); Xiangnan Zhao, Wuhan (CN); Ying Cui, Wuhan (CN); Kaikai You, Wuhan (CN); Jiameng Cui, Wuhan (CN); Lei Guan, Wuhan (CN); Chenhui Li, Wuhan (CN); An Zhang, Wuhan (CN); Lei Jin, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 235 days.

(21) Appl. No.: 18/542,128

(22) Filed: Dec. 15, 2023

(65) Prior Publication Data
US 2025/0069673 A1    Feb. 27, 2025

(30) Foreign Application Priority Data
Aug. 21, 2023    (CN) .......................... 202311064963.3

(51) Int. Cl.
G11C 16/04    (2006.01)
G11C 16/10    (2006.01)
G11C 16/34    (2006.01)

(52) U.S. Cl.
CPC ...... G11C 16/3427 (2013.01); G11C 16/0483 (2013.01); G11C 16/10 (2013.01)

(58) Field of Classification Search
CPC . G11C 16/3427; G11C 16/0483; G11C 16/10; G11C 16/32; G11C 16/08; G11C 16/24; G11C 16/12; G11C 16/30; G11C 16/34
USPC ..................................... 365/185.02
See application file for complete search history.

(56) References Cited

U.S. PATENT DOCUMENTS

| 11,211,392 B1 * | 12/2021 | Puthenthermadam ....................... H10B 43/27 |
| 11,450,386 B2 * | 9/2022 | Joe .......................... G11C 16/30 |
| 11,482,286 B2 * | 10/2022 | Shin .................... G11C 16/0483 |

* cited by examiner

Primary Examiner — Tha-O H Bui
(74) Attorney, Agent, or Firm — BAYES PLLC

(57) ABSTRACT

According to one aspect, a method of operating a memory is provided. The method may include applying a first power supply voltage to a common source during a program precharge process. The method may include applying a first voltage to a first bottom gate line and applying a second voltage to a second bottom gate line starting at a first moment of the program precharge process. The method may include applying a second power supply voltage to the first bottom gate line and applying a third voltage to the second bottom gate line after the first moment of the program precharge process.

17 Claims, 13 Drawing Sheets

METHOD OF OPERATING MEMORY, MEMORY, AND MEMORY SYSTEM

CROSS-REFERENCE TO RELATED APPLICATIONS

This application claims the benefit of priority to Chinese Application No. 202311064963.3, filed on Aug. 21, 2023, which is incorporated herein by reference in its entirety.

TECHNICAL FIELD

The present disclosure relates to the field of memory technologies, and in particular, to a method of operating a memory, a memory, and a memory system.

BACKGROUND

Not-And (NAND) flash memory is a non-volatile storage technology that can save data even when the power is turned off, offering the advantages of low storage cost and high storage capacity. With the development of NAND flash memory technologies, the circuit area of NAND is gradually reduced, and the size of the complementary metal oxide semiconductor (CMOS) circuit in NAND is also reduced. When the area of peripheral circuits is reduced, the ramping ability the memory array voltage will be affected, thus resulting in increased programming time.

SUMMARY

According to one aspect of the present disclosure, a method of operating a memory is provided. The method may include applying a first power supply voltage to a common source during a program precharge process. The method may include applying a first voltage to a first bottom gate line and applying a second voltage to a second bottom gate line starting at a first moment of the program precharge process. The first voltage may be less than a first threshold voltage of a bottom select gate connected to the first bottom gate line, and the second voltage may be greater than a second threshold voltage of a bottom select gate connected to the second bottom gate line. The method may include applying a second power supply voltage to the first bottom gate line and applying a third voltage to the second bottom gate line after the first moment of the program precharge process. The third voltage may be less than a third threshold voltage of the bottom select gate connected to the second bottom gate line.

In some implementations, the applying a second power supply voltage to the first bottom gate line and applying a third voltage to the second bottom gate line after the first moment of the program precharge process may include applying the second power supply voltage to the first bottom gate line and applying the third voltage to a top-layer bottom gate line of the second bottom gate line starting at a second moment after the first moment of the program precharge process. In some implementations, the applying a second power supply voltage to the first bottom gate line and applying a third voltage to the second bottom gate line after the first moment of the program precharge process may include applying the second power supply voltage to the first bottom gate line and the top-layer bottom gate line of the second bottom gate line and applying the third voltage to a bottom-layer bottom gate line of the second bottom gate line starting at a third moment after the second moment of the program precharge process.

In some implementations, the method may include applying a fourth voltage to the first bottom gate line before the first moment of the program precharge process. In some implementations, the fourth voltage may be less than the second voltage and greater than a fourth threshold voltage of the bottom select gate connected to the first bottom gate line.

In some implementations, the method may include applying a bias voltage to selected word lines and applying the second power supply voltage to unselected word lines during the program precharge process.

In some implementations, the method may include applying a turn-on voltage to a selected top select gate and applying the second power supply voltage to an unselected top select gate during the program precharge process.

In some implementations, the method may include applying a first program voltage and a second program voltage to the first bottom gate line before the program precharge process. In some implementations, when applying the first program voltage, a first bottom select gate of a first memory cell string and a first bottom select gate of a second memory cell string connected to the first bottom gate line may be programmed to the first threshold voltage. In some implementations, when applying the second program voltage, the first bottom select gate of the second memory cell string may be programmed to a fourth threshold voltage. In some implementations, the first threshold voltage may be less than the fourth threshold voltage.

In some implementations, applying the first program voltage and the second program voltage to the second bottom gate line. In some implementations, when applying the first program voltage, a second bottom select gate of the first memory cell string and a second bottom select gate of the second memory cell string connected to the second bottom gate line may be programmed to the third threshold voltage. In some implementations, when applying the second program voltage, the second bottom select gate of the first memory cell string may be programmed to the second threshold voltage. In some implementations, the third threshold voltage may be less than the second threshold voltage.

In some implementations, the first memory cell string and the second memory cell string may be located in different fingers.

According to another aspect of the present disclosure, a memory is provided. The memory may include a plurality of memory cell strings. The plurality of memory strings may include a plurality of bottom select gates connected in series. A first bottom select gate of a first memory cell string and a first bottom select gate of a second memory cell string may be connected to a first bottom gate line. A second bottom select gate of the first memory cell string and a second bottom select gate of the second memory cell string may be connected to a second bottom gate line. The second bottom select gate may be located between the first bottom select gate and a common source. The memory may include a peripheral circuit. The peripheral circuit may be configured to apply a first power supply voltage to the common source during a program precharge process. The peripheral circuit may be configured to apply a first voltage to the first bottom gate line and apply a second voltage to the second bottom gate line starting at a first moment of the program precharge process. The first voltage may be less than a first threshold voltage of the bottom select gate connected to the first bottom gate line. The second voltage may be greater than a second threshold voltage of the bottom select gate connected to the second bottom gate line. The peripheral circuit may be configured to apply a second power supply voltage to the first bottom gate line and apply a third voltage to the second bottom gate line after the first moment of the program precharge process. The third voltage may be less than a third threshold voltage of the bottom select gate connected to the second bottom gate line.

In some implementations, the second bottom gate line may include a top-layer bottom gate line and a bottom-layer bottom gate line. In some implementations, the peripheral circuit may be further configured to apply the second power supply voltage to the first bottom gate line and apply the third voltage to the top-layer bottom gate line of the second bottom gate line starting at a second moment after the first moment of the program precharge process. In some implementations, the peripheral circuit may be further configured to apply the second power supply voltage to the first bottom gate line and the top-layer bottom gate line of the second bottom gate line and apply the third voltage to the bottom-layer bottom gate line of the second bottom gate line starting at a third moment after the second moment of the program precharge process.

In some implementations, the peripheral circuit may be further configured to apply a fourth voltage to the first bottom gate line before the first moment of the program precharge process. In some implementations, the fourth voltage may be less than the second voltage and greater than a fourth threshold voltage of the bottom select gate connected to the first bottom gate line.

In some implementations, the peripheral circuit may be further configured to apply a bias voltage to selected word lines and apply the second power supply voltage to unselected word lines during the program precharge process.

In some implementations, the peripheral circuit may be further configured to apply a turn-on voltage to a selected top select gate and apply the second power supply voltage to an unselected top select gate during the program precharge process.

In some implementations, the peripheral circuit may be further configured to apply a first program voltage and a second program voltage to the first bottom gate line before the program precharge process. In some implementations, when applying the first program voltage, the first bottom select gate of the first memory cell string and the first bottom select gate of the second memory cell string connected to the first bottom gate line may be programmed to the first threshold voltage. In some implementations, when applying the second program voltage, the first bottom select gate of the second memory cell string may be programmed to a fourth threshold voltage. In some implementations, the first threshold voltage may be less than the fourth threshold voltage.

In some implementations, the peripheral circuit may be further configured to apply the first program voltage and the second program voltage to the second bottom gate line. IN some implementations, when applying the first program voltage, the second bottom select gate of the first memory cell string and the second bottom select gate of the second memory cell string connected to the second bottom gate line may be programmed to the third threshold voltage. In some implementations, when applying the second program voltage, the second bottom select gate of the first memory cell string may be programmed to the second threshold voltage. In some implementations, the third threshold voltage may be less than the second threshold voltage.

In some implementations, the first memory cell string and the second memory cell string may be located in different fingers.

According to a further aspect of the present disclosure, a memory system is provided. The memory system may include one or more memories. The one or more memories may each include a plurality of memory cell strings. The plurality of memory cell strings may include a plurality of bottom select gates connected in series. A first bottom select gate of a first memory cell string and a first bottom select gate of a second memory cell string may be connected to a first bottom gate line. A second bottom select gate of the first memory cell string and a second bottom select gate of the second memory cell string may be connected to a second bottom gate line. The second bottom select gate may be located between the first bottom select gate and a common source. The one or more memories may each include a peripheral circuit. The peripheral circuit may be configured to apply a first power supply voltage to the common source during a program precharge process. The peripheral circuit may be configured to apply a first voltage to the first bottom gate line and apply a second voltage to the second bottom gate line starting at a first moment of the program precharge process. The first voltage may be less than a first threshold voltage of the bottom select gate connected to the first bottom gate line. The second voltage may be greater than a second threshold voltage of the bottom select gate connected to the second bottom gate line. The peripheral circuit may be configured to apply a second power supply voltage to the first bottom gate line and apply a third voltage to the second bottom gate line after the first moment of the program precharge process. The third voltage may be less than a third threshold voltage of the bottom select gate connected to the second bottom gate line. The memory system may include a memory controller coupled to the memories and configured to control the memories.

BRIEF DESCRIPTION OF THE DRAWINGS

In order to explain the technical solutions in the present disclosure more clearly, the drawings required to be used in some examples of the present disclosure will be briefly introduced below. Obviously, the drawings in the following description are only drawings of some examples of the present disclosure. For those of ordinary skill in the art, other drawings can also be obtained based on these drawings. In addition, the drawings in the following description can be regarded as schematic diagrams and are not intended to limit the actual size of the product, the actual flow of the method, the actual timing of the signals and the like involved in the examples of the present disclosure.

DETAILED DESCRIPTION

Figure 1:
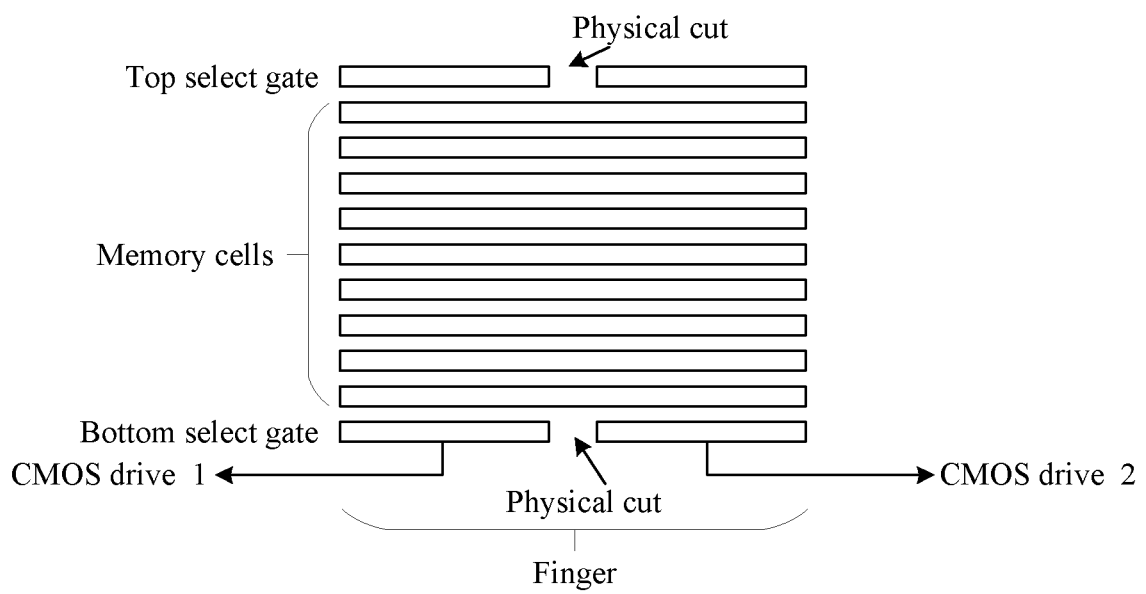
FIG. 1 is a schematic diagram of a physical cut, according to an example of the present application.

The technical solutions in some examples of the present disclosure will be clearly and completely described below with reference to the accompanying drawings. Obviously, the described examples are only some of the examples of the present disclosure, rather than all of the examples. Based on the examples provided by this disclosure, all other examples obtained by those of ordinary skill in the art fall within the scope of protection of this disclosure.

It is understood that, in the description of the present disclosure, the orientations or positional relationships as indicated by the terms "center", "upper", "lower", "front", "back", "left", "right", "vertical", "horizontal", "top", "bottom", "inner", "outer", etc., are based on the orientations or positional relationships shown in the drawings, and are only for the convenience of describing the present disclosure and simplifying the description, but not indicating or implying the referred devices or elements have a specific orientation, be constructed and operate in a specific orientation and therefore are not to be construed as limitations on the disclosure.

Unless the context requires otherwise, the term "including" is to be interpreted in an open, inclusive sense throughout the specification and claims, that is, it means "including, but not limited to". In the description of the specification, the terms "one example," "some examples," or "example" and the like are intended to indicate specific features, structures, materials or characteristics associated with the example are included in at least one example of the present disclosure. The schematic representations of the above terms do not refer to the same example. Furthermore, the specific features, structures, materials or characteristics as described may be included in any suitable manner in any one or more examples.

Hereinafter, the terms "first" and "second" are used for descriptive purposes only, and should not be understood as indicating or implying relative importance or implicitly indicating the quantity of indicated technical features. Therefore, features defined by "first" and "second" may explicitly or implicitly include one or more of these features. In the description of the examples of the present disclosure, "plurality" means two or more, unless otherwise specified. "At least one of A, B and C" has the same meaning as "at least one of A, B or C" and includes the following combinations of A, B and C: A only, B only, C only, a combination of A and B, a combination of A and C, a combination of B and C, and a combination of A, B and C. "At least one of A or B" includes the following three combinations: A only, B only, and a combination of A and B.

The use of "adapted to" or "configured to" herein implies open and inclusive language that does not exclude devices that are adapted to or configured to perform additional tasks or operations.

Additionally, the use of "based on" is meant to be open and inclusive in that a process, operation, calculation or other action "based on" one or more stated conditions or values may in practice be based on additional conditions or values beyond.

As used herein, the term "substrate" refers to a material on which subsequent layers of material may be added. The substrate itself can be patterned. The material added to the substrate may be patterned or may remain unpatterned. Additionally, the substrate may include a variety of semiconductor materials such as silicon, germanium, gallium arsenide, indium phosphide, and the like. Alternatively, the substrate may be made from a non-conductive material such as glass, plastic or sapphire wafer.

The term "three-dimensional memory" refers to a semiconductor device formed by memory cell transistor strings (herein referred to as "memory cell strings", such as NAND memory cell strings) arranged in an array on a main surface of a substrate or source layer and extending in a direction perpendicular to the substrate or source layer. As used herein, the term "vertical/vertically" means nominally perpendicular to the main surface (i.e., lateral surface) of the substrate or source layer.

In order to reduce the programming time of some memory systems, a method is generally employed to reduce the loading that the peripheral circuit needs to drive to thereby reduce the ramp up/ramp down time of the word line (WL) and the like. However, programming interference may occur when the loading that peripheral circuit uses to drive is reduced. Therefore, reduction of programming interference is one problem of these systems.

To overcome these and other challenges, and in order to effectively improve the programming interference during memory programming, the present disclosure provides a program precharge process that may be performed on a memory (such as a NAND flash memory) before performing a programming operation on the memory, to increase the coupling potential of the channel corresponding to a programming inhibit memory cell string in the memory when performing the programming operation on a selected memory cell string in the memory. The programming inhibit memory cell string can also be understood as an unselected memory cell string or a non-programmed string. By increasing the coupling potential of the channel corresponding to the unselected memory cell string, programming of the unselected memory cell string can be suppressed, thereby reducing programming interference.

To achieve the turn-off of unselected memory cell strings, a physical cut method may be used. As shown in FIG. 1, a schematic diagram of a physical cut according to an example of the present application is illustrated. FIG. 1 shows a finger, and a finger includes a top select gate (TSG), multiple memory cells and a bottom select gate (BSG). Both the top select gate and the bottom select gate are provided with physical cut structures. In an example, after the bottom select gate is physically cut, the bottom select gate is connected to a complementary metal oxide semiconductor (CMOS). At this time, CMOS drive 1 can control the turn-on and turn-off of a part of the bottom select gate, and CMOS drive 2 can control the turn-on and turn-off of another part of the bottom select gate.

Figure 2:
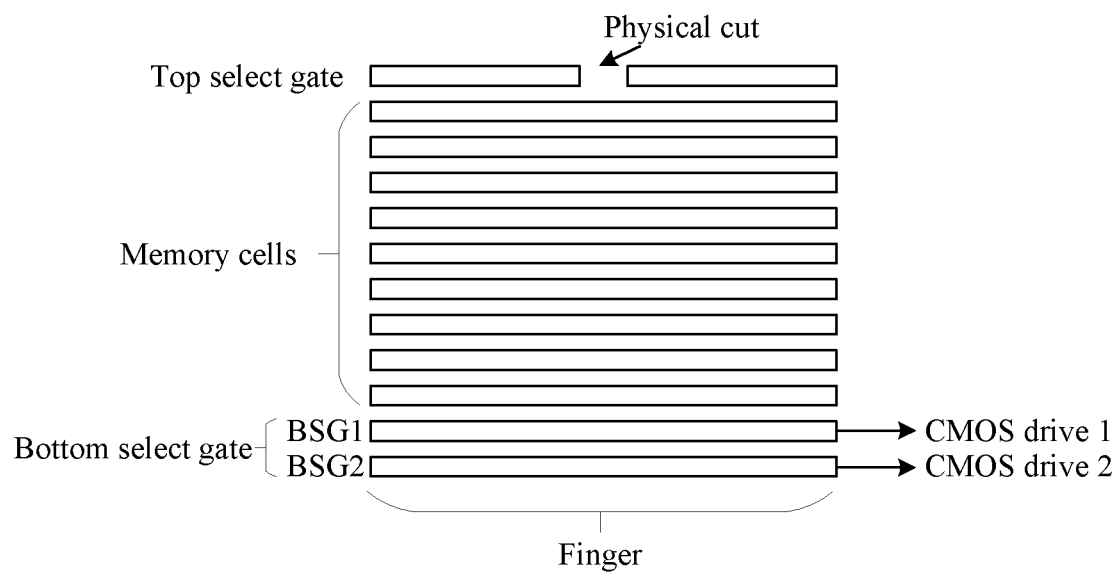
FIG. 2 is a schematic diagram of an electrical cut, according to an example of the present application.

However, using the physical cut method will increase the manufacturing cost of the memory. Therefore, an electrical cut method is proposed, as shown in FIG. 2. FIG. 2 is a schematic diagram of an electrical cut according to an example of the present application. The finger shown in FIG. 2 includes a top select gate, a plurality of memory cells and a bottom select gate. The top select gate is physically cut, and the bottom select gate is electrically cut. In some examples, the bottom select gate includes BSG1 and BSG2, where BSG1 is connected to CMOS driver 1, and BSG2 is connected to CMOS drive 2. At this time, the threshold voltages of the multiple bottom select gates in BSG1 and BSG2 are different. Therefore, different voltages may be applied to CMOS drive 1 and CMOS drive 2 to control the multiple bottom select gates in BSG1 and BSG2 to turn on or off, so that the bottom select gate of the same page can be turned on or off.

Figure 3:
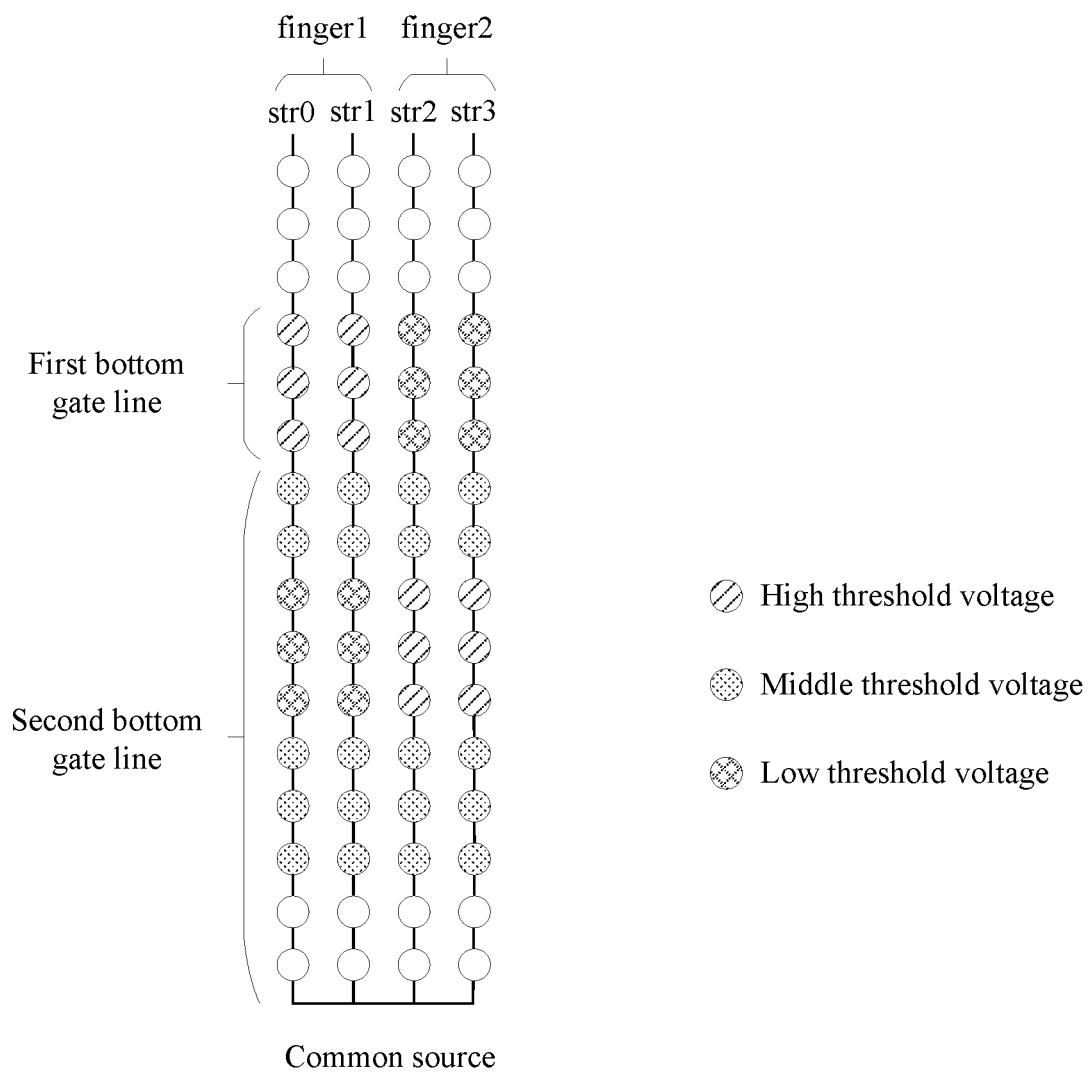
FIG. 3 is a schematic diagram of a memory cell array that enables the electrical cut, according to an example of the present application.

In some examples, as shown in FIG. 3, a first finger (finger1) and a second finger (finger2) are illustrated. The finger1 includes two memory strings (str0 and str1), and the finger2 includes two memory strings (str2 and str3). FIG. 3 shows only some of the memory cells, bottom select gates and a common source connected in series. Some of the bottom select gates are connected to the first bottom gate line, some of the bottom select gates are connected to the second bottom gate line, and the bottom select gates connected to the second bottom gate line are closer to the common source. In order to avoid memory string failure caused by damage to a single bottom select gate, the first bottom gate line can be connected to multiple layers of bottom select gates. That is, the first bottom gate line may include multiple word lines (WL), and applying a turn-off voltage to the bottom gate line can be understood as applying the same turn-off voltage to multiple word lines. The second bottom gate line can also be connected to the multiple layers of bottom select gates. That is, the second bottom gate line also includes multiple word lines, and applying a turn-off voltage to the second bottom gate line can be understood as applying the same turn-off voltage to the multiple word lines. Before programming between memory cells, multiple bottom select gates can be programmed so that the threshold voltages of the multiple bottom select gates are different so as to achieve the electrical cut. In an example, the bottom select gates of finger1 connected to the first bottom gate line have a high threshold voltage (HV), and the bottom select gates of finger2 connected to the first bottom gate line have a low threshold voltage. In addition, the bottom select gates of finger1 connected to the second bottom gate line have a low threshold voltage, and the bottom select gates of finger2 connected to the second bottom gate line have a high threshold voltage. In addition, the bottom select gates of finger1 and finger2 connected to the second bottom gate line further include bottom select gates having a middle threshold voltage. The bottom select gates having a middle threshold voltage is used to isolate the bottom select gates having a high threshold voltage from the bottom select gates having a low threshold voltage.

The electrical cut may be realized by applying a first turn-on voltage to the first bottom gate line. The first turn-on voltage may be greater than the high threshold voltage, and the bottom select gates connected to the first bottom gate line may all be turned on. The electrical cut may be realized by applying a second turn-on voltage to the second bottom gate line. The second turn-on voltage may be greater than the low threshold voltage and less than the high threshold voltage. At this time, the bottom select gates of finger1 connected to the second bottom gate line are turned on, and the bottom select gates of finger2 connected to the second bottom gate line are turned off. As a result, the bottom select gates of finger1 are all turned on, and the bottom select gates of finger2 are partially turned off. At this time, the memory cell strings of finger2 are unselected memory cell strings. In another implementation, applying the second turn-on voltage to the first bottom gate line, and at this time, the finger1 connected to the first bottom gate line is turned off, and the finger2 connected to the first bottom gate line is turned on. Applying the first turn-on voltage to the second bottom gate line, and at this time, both finger1 and finger2 connected to the second bottom gate line may be turned on. As a result, the bottom select gates of finger1 are partially turned off, and the bottom select gates of finger2 are all turned on. At this time, the memory cell strings of finger1 are unselected memory cell strings.

Figure 4:
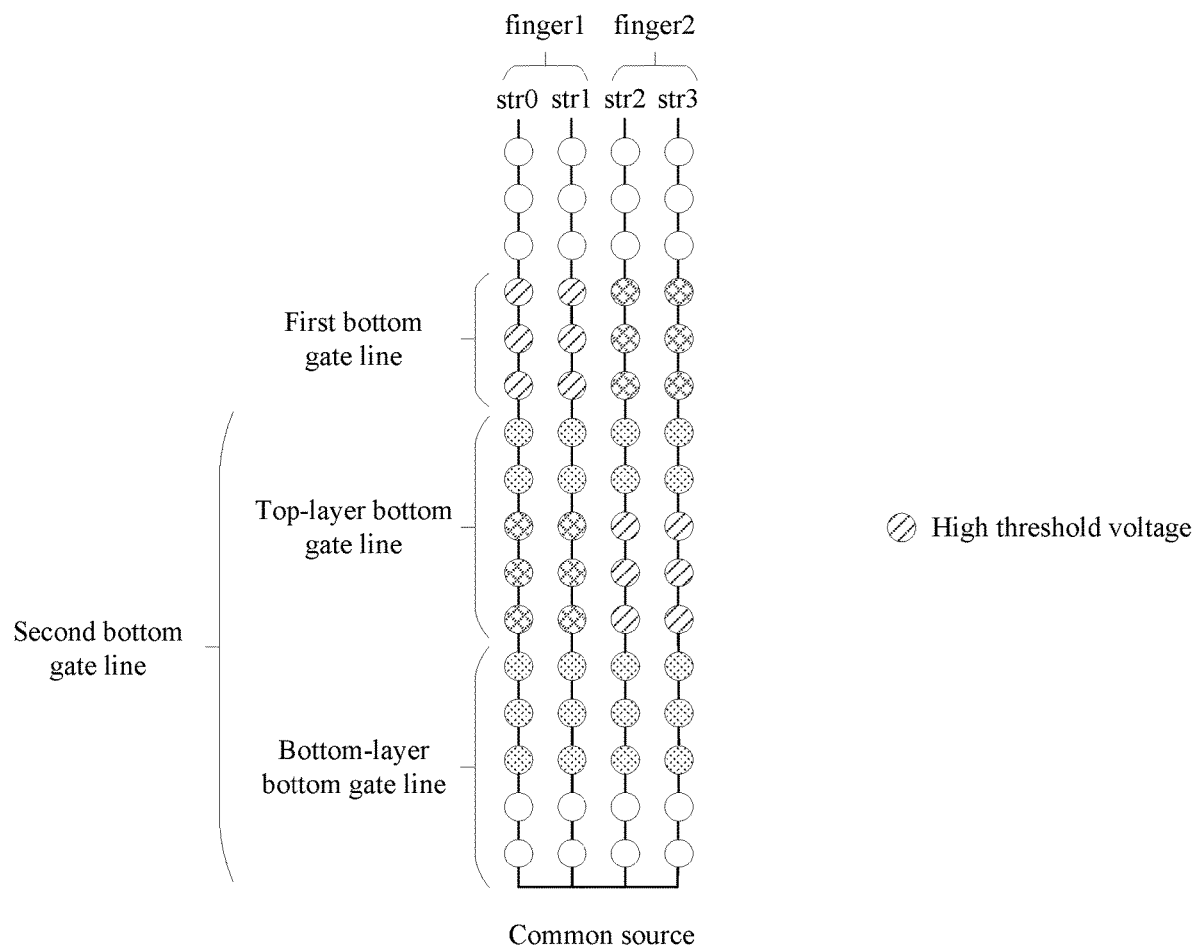
FIG. 4 is a schematic diagram of another memory cell array that enables the electrical cut, according to an example of the present application.

In another implementation, as shown in FIG. 4, the first finger (finger1) and the second finger (finger2) are illustrated. The finger1 may include two memory strings (str0 and str1), and the finger2 includes two memory strings (str2 and str3). FIG. 4 shows only some of the memory cells, bottom select gates and a common source connected in series. A part of the bottom select gates are connected to the first bottom gate line, another part of the bottom select gates are connected to a top-layer bottom gate line of the second bottom gate line, and yet another part of the bottom select gates are connected to a bottom-layer bottom gate line of the second bottom gate line. The first bottom gate line, the top-layer bottom gate line of the second bottom gate line, and the bottom-layer bottom gate line of the second bottom gate line are arranged in sequence, and the bottom-layer bottom gate line of the second bottom gate line is closer to the common source. In an example, the bottom select gates of the finger1 connected to the first bottom gate line have a high threshold voltage, and the bottom select gates of the finger2 connected to the first bottom gate line have a low threshold voltage. In addition, the bottom select gates of the finger1 connected to the top-layer bottom gate line of the second bottom gate line have a low threshold voltage, the bottom select gates of the finger2 connected to the top-layer bottom gate line of the second bottom gate line have a high threshold voltage, and the bottom select gates connected to the top-layer bottom gate line of the second bottom gate line may also have a medium threshold voltage. In addition, the bottom select gates connected to the bottom-layer bottom gate line of the second bottom gate line have a medium threshold voltage.

However, in order to reduce programming time, unselected memory cell strings are selectively turned off to reduce the loading that peripheral circuits need to drive and to reduce the ramp up/ramp down time of word lines and the like. When the unselected memory cell strings are selectively turned off, there will be remaining electrons in the channels of the unselected memory cell strings due to the different threshold voltages of the bottom select gates, and the remaining electrons will cause programming interference.

Therefore, examples of the present application provide a method of operating a memory. By performing a timing turning off of the first bottom gate line and the second bottom gate line, and by applying the first power supply voltage to the common source, that is, the common source is at a high potential. At this time, the electrons remaining in the channel when the bottom select gate is turned off will flow to the common source, thereby reducing the programming interference.

In order to facilitate understanding, the memory system to which the operation method of the memory provided by the example of the present application is applied will be introduced below.

Figure 5:
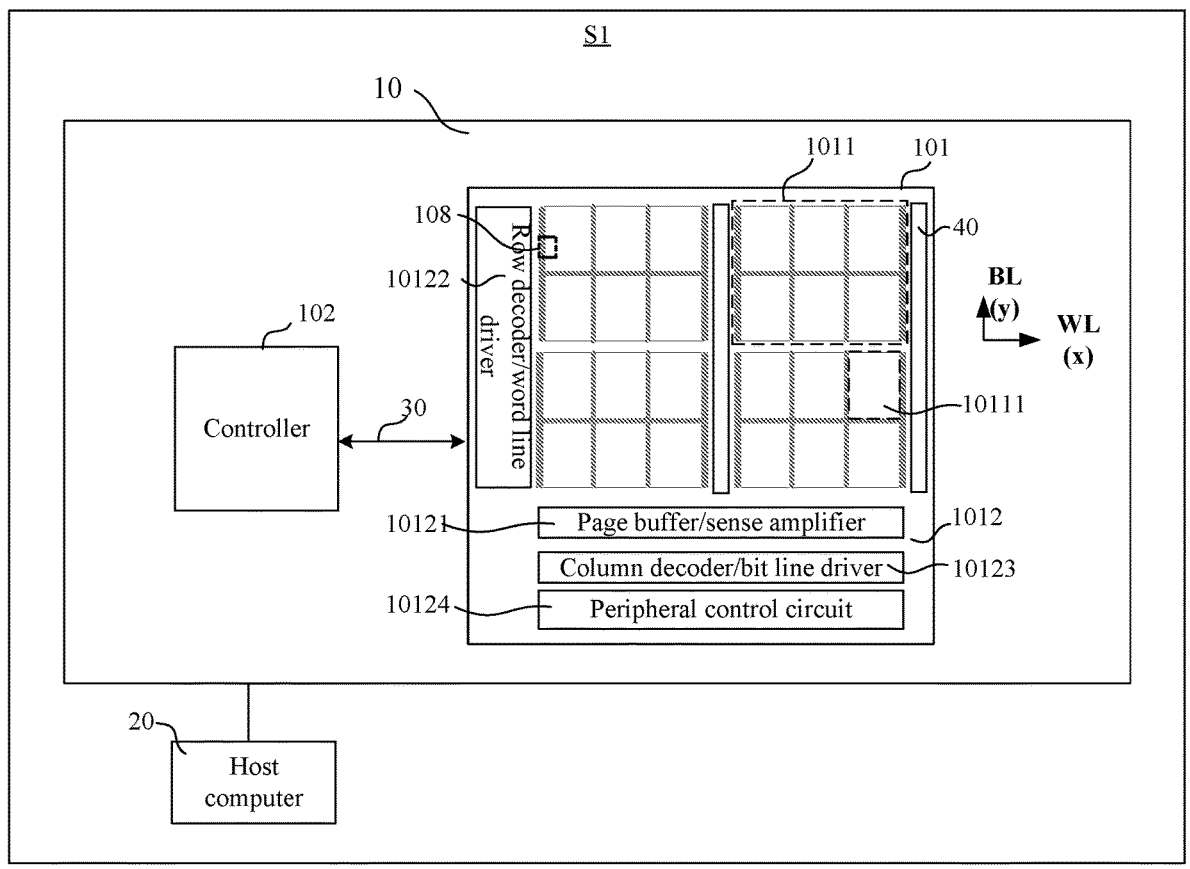
FIG. 5 is a schematic structural diagram of an example system S1 with a memory system 10, according to an example of the present application.

As shown in FIG. 5, a schematic structural diagram of an example system S1 with a memory system 10 according to an example of the present disclosure is illustrated. System S1 may be a mobile phone, desktop computer, laptop computer, tablet computer, vehicle computer, game console, printer, positioning device, wearable electronic device, smart sensor, virtual reality (VR) device, augmented reality (AR) device or any other suitable electronic device having storage therein, etc. Memory system 10 (which may also be referred to as a NAND memory system) includes memory 101 and a controller 102. Memory system 10 may communicate with a host computer 20 by the controller 102, which may be coupled to the memory 101 via a memory channel 30. In some examples, the memory 101 in the present disclosure may be a three-dimensional non-volatile memory, such as a NAND flash memory. NAND flash memory may also be referred to as flash memory or NAND for short. Of course, the memory 101 in this disclosure may also be other memories. Memory system 10 may have more than one memory 101, and each memory 101 may be managed by the controller 102.

In some examples, the host computer 20 may be a processor of an electronic device, such as a central processing unit (CPU), a system-on-chip (SoC) or an application processor (AP). The host computer 20 may send data to be stored at the memory system 10 or read data stored at the memory system 10.

The controller 102 may process input/output (I/O) requests received from the host computer 20, ensuring data integrity and efficient storage, and may also manage the memory 101. Memory channel 30 may provide data via a data bus and control communication between the controller 102 and the memory 101.

Continuing with reference to FIG. 5, the memory 101 may be a memory chip (package), a memory die, or any portion of a memory die, and may include one or more memory planes 1011, each of which may include multiple memory blocks 10111. Identical and concurrent operations can occur at each memory plane 1011. The size of the memory block 10111 may be in megabytes (MB), and the memory block 10111 is the smallest unit for an erase operation. The memory 101 illustrated in FIG. 5 includes four memory planes 1011, and each memory plane 1011 includes six memory blocks 10111. Each memory block 10111 may include a plurality of memory cells. Each memory cell may be addressed through, for example, bit lines (BL) and word line (WL). Bit lines and word lines may be arranged vertically (e.g., in rows and columns, respectively) to form an array of metal lines. The directions of the bit lines and word lines are labeled "BL" and "WL" respectively in FIG. 5. In this disclosure, one or more memory blocks 10111 may also be referred to as a "memory array" or "array." A memory array is a core area in a memory device that performs storage functions.

The memory 101 further includes a peripheral circuit area 1012, that is, a peripheral area of the memory plane 1011. The peripheral circuit area 1012 (also referred to as a "peripheral circuit") contains a number of digital, analog, and/or mixed-signal circuits (e.g., a page buffer/sense amplifier 10121, a row decoder/word line driver 10122, a column decoder/bit line driver 10123 and a peripheral control circuit 10124) to support the functions of the memory 101. The peripheral control circuit 10124 may include registers, active and/or passive semiconductor devices, such as transistors, diodes, capacitors or resistors, etc., which is obvious to those of ordinary skill in the art. The peripheral control circuit 10124 in the peripheral circuit area 1012 may be configured to initiate a programming operation on a selected memory cell of a NAND memory string in the memory block 10111. In some examples, the peripheral control circuit 10124 receives a programming command from the controller 102 via an interface, and in response, sends a control signal to the row decoder/word line driver 10122, column decoder/bit line driver 10123 and a voltage generator (not shown in FIG. 5) provided in the peripheral circuit area 1012 to initiate the programming operation on the selected memory cell.

It is noted that the layout of the electronic devices in the memory system 10 and the memory 101 in FIG. 5 is shown as an example. Memory system 10 and memory 101 may have other layouts and may include additional devices. For example, the memory 101 may also include a high-voltage charge pump, an input-output circuit, and the like. The memory system 10 may also include firmware, data scramblers, and the like. In some examples, the peripheral circuit area 1012 and the memory array may be independently formed on separate wafers and connected to each other by wafer bonding.

Figure 6:
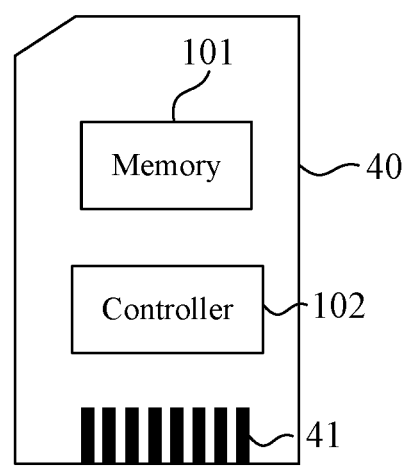
FIG. 6 is a schematic diagram of a memory card, according to an example of the present application.
Figure 7:
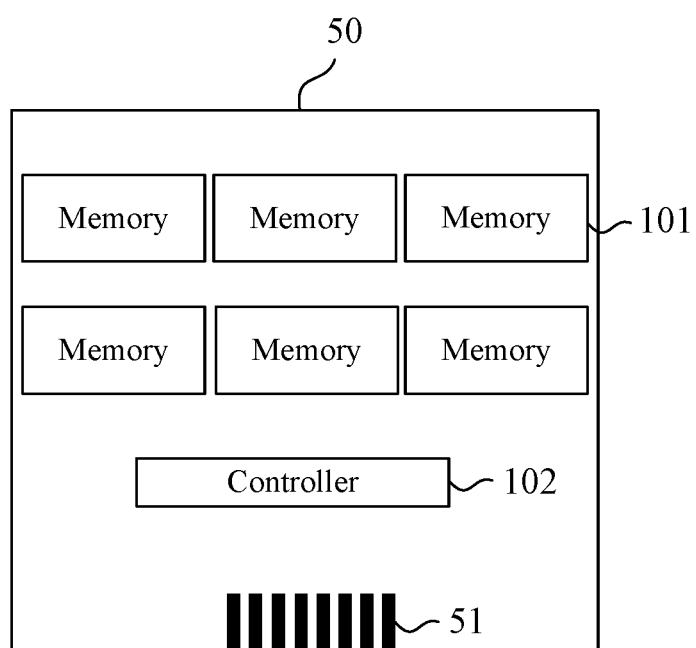
FIG. 7 is a schematic diagram of another memory card, according to an example of the present application.

The controller 102 and one or more memories 101 may be integrated into various types of storage devices, for example, included in the same package, such as a universal flash storage (UFS) package or an embedded multi-media card (eMMC) package. That is, memory system 10 may be implemented and packaged into different types of end electronic products. In one example, as shown in FIG. 6, the controller 102 and a single memory 101 may be integrated into a memory card 40. The memory card 40 may include a personal computer memory card international association (PCMCIA) card, a compact flash (CF) card, a smart media (SM) card, a memory stick, a multimedia card (MMC), a secure digital memory card (SD card) or UFS, etc. The memory card 40 may also include a memory card connector 41 coupling the memory card 40 with the host computer 20. In another example as shown in FIG. 7, the controller 102 and the multiple memories 101 may be integrated into a solid state drive (SSD) 50. SSD 50 may further include an SSD connector 51 coupling the SSD 50 with the host computer 20.

Figure 8:
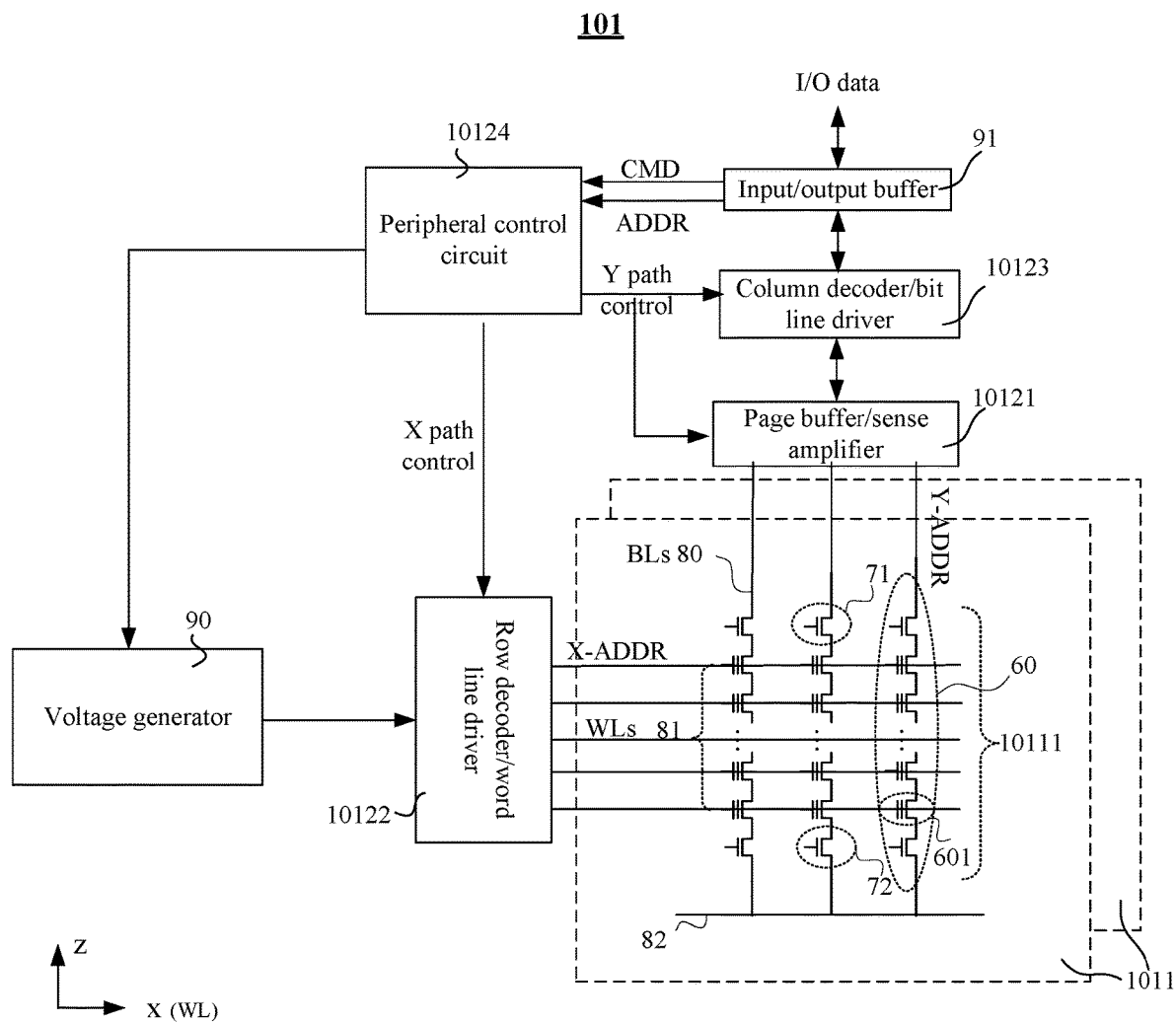
FIG. 8 is a schematic structural diagram of a memory, according to an example of the present application.

As shown in FIG. 8, a schematic structural diagram of a memory 101 according to an example of the present disclosure is shown. Memory 101 includes one or more memory blocks 10111. Each memory block 10111 includes a memory string 60. Each memory string 60 includes memory cells 601. Memory cells 601 sharing the same bit line form a memory string 60. The memory string 60 may also include at least one field-effect transistor (e.g., a metal-oxide-semiconductor field-effect transistor (MOSFET)) at each end, and the field-effect transistor is controlled by a top select gate 71 and a bottom select gate 72. A drain terminal of the top select gate 71 may be connected to a bit line 80 and a source terminal of the bottom select gate 72 may be connected to an array common source (ACS) 82. The ACS 82 may be shared by the memory strings 60 throughout the memory block 10111 and is also referred to as a common source line (SL).

In some examples, the peripheral circuit area 1012 of the memory 101 may support erase operations of gate-induced drain leakage (GIDL)-assisted technology. The memory block 10111 may be coupled to the row decoder/word line driver 10122 via a word line 81, the top select gate 71, and the bottom select gate 72. The memory block 10111 may be coupled to the page buffer/sense amplifier 10121 via the bit line 80. The row decoder/word line driver 10122 may select one of the memory blocks 10111 on the memory 101 in response to an X path control signal provided by the peripheral control circuit 10124. The row decoder/word line driver 10122 may pass a voltage provided from a voltage generator 90 to the word line 81 according to the X path control signal. During read and program operations, the row decoder/word line driver 10122 may deliver a read voltage Vread and a program voltage Vpgm to a selected word line 81 according to the X path control signal received from the peripheral control circuit 10124 and deliver a pass voltage Vpass to unselected word lines.

The column decoder/bit line driver 10123 may deliver an inhibit voltage Vinhibit to non-selected bit lines according to a Y path control signal received from the peripheral control circuit 10124, and connect a selected bit line 80 to ground. That is, the column decoder/bit line driver 10123 may be configured to select or deselect one or more memory strings 60 based on the Y path control signal from the peripheral control circuit 10124. The page buffer/sense amplifier 10121 may be configured to read data from and program (write) data to the memory block 10111 based on the Y path control signal from the peripheral control circuit 10124. For example, the page buffer/sense amplifier 10121 may store a page of data to be programmed into a memory page. In another example, the page buffer/sense amplifier 10121 may perform verification operations to ensure that data has been correctly programmed into each memory cell 601. In yet another example, during a read operation, the page buffer/sense amplifier 10121 may sense current flowing through the bit line 80 reflecting the logic state (i.e., data) of the memory cell 601 and amplify the small signal by a measurable signal amplification.

An input/output buffer 91 may pass I/O data from/to the page buffer/sense amplifier 10121, as well as pass an address ADDR signal or a command CMD signal to the peripheral control circuit 10124. In some examples, the input/output buffer 91 may serve as an interface between the controller 102 and the memory 101.

The peripheral control circuit 10124 may control the page buffer/sense amplifier 10121 and the row decoder/word line driver 10122 in response to the command CMD passed by the input/output buffer 91. During a programming operation, the peripheral control circuit 10124 may control the row decoder/word line driver 10122 and the page buffer/sense amplifier 10121 to program selected memory cells 601. During a read operation, the peripheral control circuit 10124 may control the row decoder/word line driver 10122 and the page buffer/sense amplifier 10121 to read selected memory cells 601. The X path control signal includes a row address X-ADDR and the Y path control signal includes a column address Y-ADDR, which may be used to locate a selected memory cell 601 in the memory block 10111. The row address X-ADDR may include a page index, a block index, and a plane index to identify the memory page, memory block 10111, and memory plane 1011 respectively. Column address Y-ADDR can identify a byte or word in the data of a memory page.

In some implementations, the peripheral control circuit 10124 may include one or more control logic units. Each control logic unit described herein may be a software module and/or firmware module run on a processor, such as a microcontroller unit (MCU) as part of the peripheral control circuit 10124, or a finite-state machine (FSM) hardware module, e.g., an integrated circuit (IC), such as an application-specific IC (ASIC), a field-programmable gate array (FPGA), etc., or a combination of software modules, firmware modules and hardware modules.

The voltage generator 90 may generate the voltages supplied to the word line 81 and the bit line 80 under the control of the peripheral control circuit 10124. The voltages generated by the voltage generator 90 include the read voltage Vread, the program voltage Vpgm, the pass voltage Vpass, the inhibit voltage Vinhibit, and the like.

In some examples, the memory 101 may be formed based on floating gate technology. In some examples, memory 101 may be formed based on charge trapping technology. Charge trapping-based memory 101 can provide high storage density and high intrinsic reliability. Stored data or logic state (e.g., threshold voltage Vth of the memory cell 601) depends on the amount of charges trapped in the memory layer. In some examples, the memory 101 may be a three-dimensional (3D) memory device, where memory cells 601 may be stacked vertically on top of each other.

In some examples, when performing an erase operation, by implementing a negative voltage difference between a gate and a source terminal (e.g., ACS82) of a memory cell 601, all trapped electronic charges in the memory layer of the memory cell 601 can be removed, and all memory cells 601 in the same memory block 10111 may be reset to an erased state ER as logic "1". For example, the voltage difference can be induced by setting the control gate in the memory cell 601 to ground and applying a positive voltage to the source line 82. In this example, a voltage pulse may be applied to the memory cell 601 during an erase operation.

Figure 9:
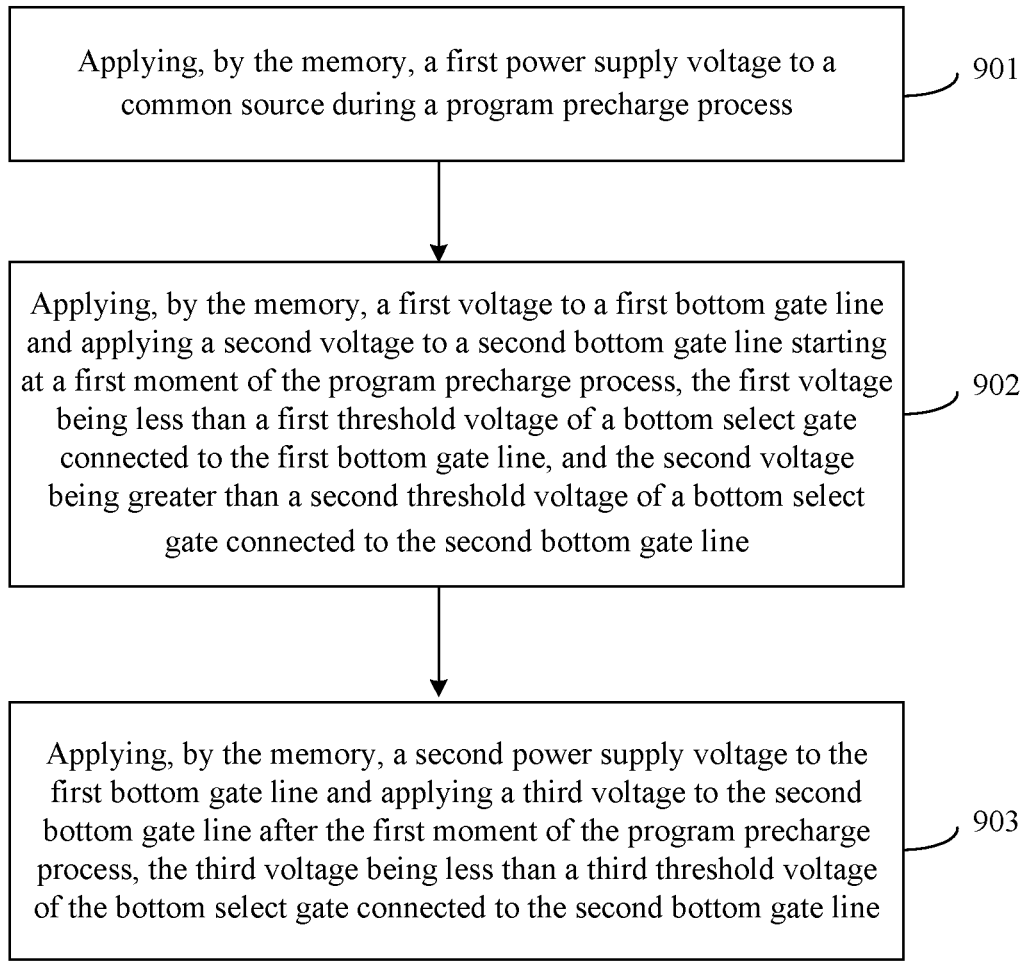
FIG. 9 is a flow chart of a method of operating a memory, according to an example of the present application.

An example of the present application provides a method of operating a memory, which is applied to the above-mentioned memory, as shown in FIG. 9. FIG. 9 is a flow chart of a method of operating a memory, according to an example of the present application. The operation method of a memory includes the following operations.

For instance, at S901, the method may include applying, by the memory, a first power supply voltage to a common source during a program precharge process.

For example, the memory may include a memory array composed of multiple memory cells, and the memory cells may include single-level cells, multi-level cells, trinary-level cells, quad-level cells, or higher-level cells. The programming operation of the memory cells may include a program precharge process and a program process.

For example, the first power supply voltage may be a system voltage (Vdd) of the memory. During the program precharge process, the voltage at the common source is the first power supply voltage. That is, the common source is at a high potential, which may attract electrons remaining in the channel when the bottom select gate is turned off to flow to the common source to reduce programming interference.

At S902, the method may include applying, by the memory, a first voltage to a first bottom gate line and applying a second voltage to a second bottom gate line starting at a first moment of the program precharge process. The first voltage may be less than a first threshold voltage of a bottom select gate connected to the first bottom gate line, and the second voltage may be greater than a second threshold voltage of a bottom select gate connected to the second bottom gate line.

For example, the first threshold voltage may be the minimum threshold voltage of the bottom select gate connected to the first bottom gate line. That is, the first voltage may be less than the low threshold voltage of the bottom select gate connected to the first bottom gate line. The second threshold voltage may be the maximum threshold voltage of the bottom select gate connected to the second bottom gate line. That is, the second voltage may be greater than the high threshold voltage of the bottom select gate connected to the second bottom gate line.

At S903, the method may include applying, by the memory, a second power supply voltage to the first bottom gate line and applying a third voltage to the second bottom gate line after the first moment of the program precharge process. The third voltage may be less than a third threshold voltage of the bottom select gate connected to the second bottom gate line.

For example, the third threshold voltage may be the minimum threshold voltage of the bottom select gate connected to the second bottom gate line. That is, the third voltage may be less than the low threshold voltage of the bottom select gate connected to the second bottom gate line. In addition, the second power supply voltage may be the voltage at the ground (VSS) of the memory.

Figure 10:
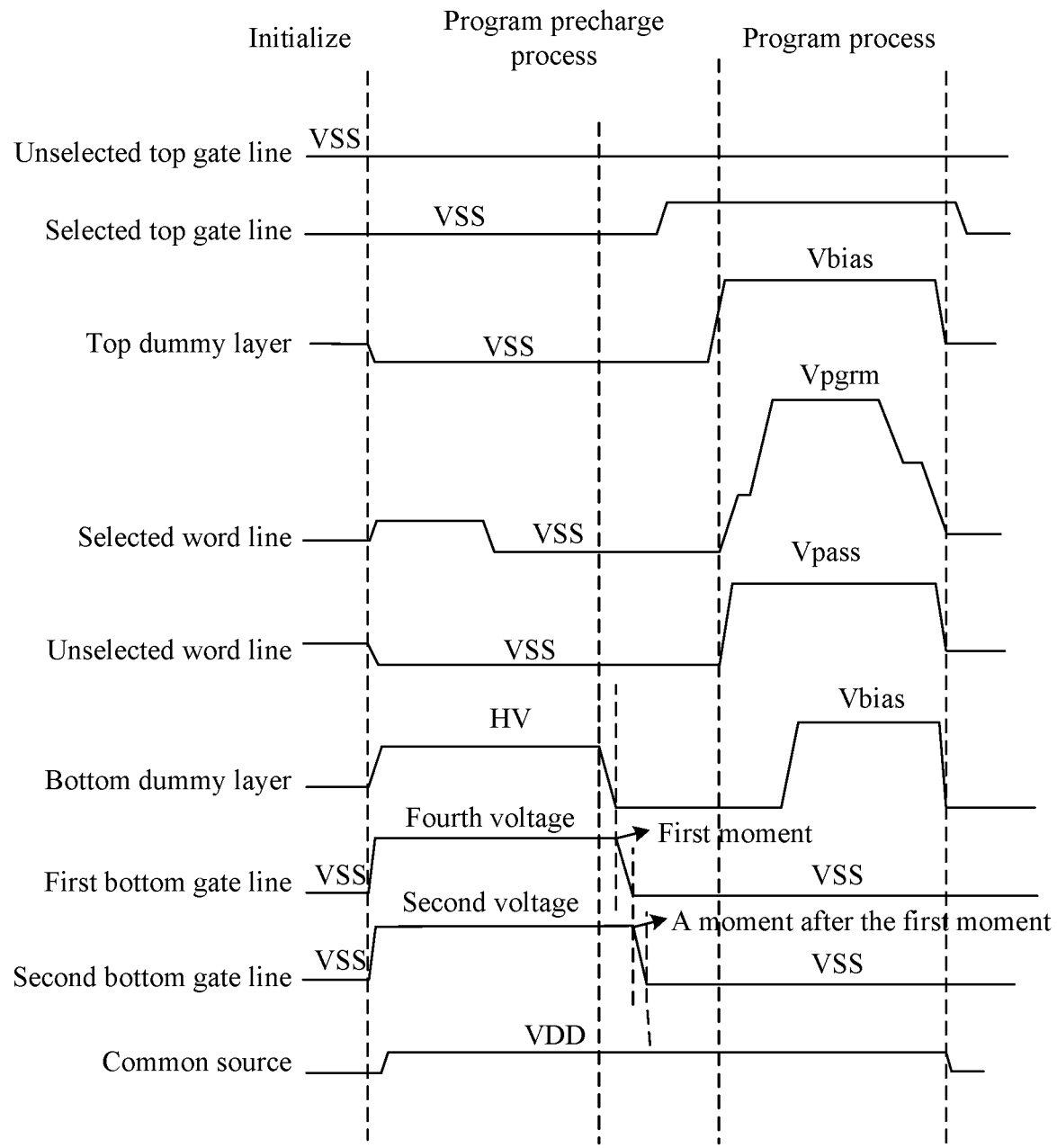
FIG. 10 is a timing diagram of a programming operation of a memory, according to an example of the present application.

As shown in FIG. 10, a timing diagram of a programming operation of a memory is shown. The voltage at the common source is the first power supply voltage during the program precharge process and the program process. At a first moment, a first voltage is applied to the first bottom gate line, and the first voltage is less than the first threshold voltage. Therefore, the bottom select gate connected to the first bottom gate line starts to be turned off. At this time, a second voltage is applied to the second bottom gate line, and the second voltage is greater than the second threshold voltage. Therefore, the bottom select gate connected to the second bottom gate line is still in a turn-on state, and the electrons remaining in the channel caused by the bottom select gate connected to the first bottom gate line being turned off can be attracted to the common source through the bottom select gate connected to the second bottom gate line.

After the first moment, a third voltage is applied to the second bottom gate line, and the third voltage is less than the third threshold voltage. Therefore, the bottom select gate connected to the second bottom gate line starts to be turned off. Thus, the electrons remaining in the channel caused by the bottom select gate connected to the second bottom gate line being turned off can be attracted to the common source. As a result, electrons remaining in the channel can be reduced, and programming interference can be reduced.

In an example, the method may further include applying a turn-on voltage to a selected top select gate and applying the second power supply voltage to an unselected top select gate during the program precharge process.

Referring again to FIG. 10, for the top select gates, the second power supply voltage may be applied to the unselected top select gate during the program precharge process and the program process, and the second power supply voltage may be applied to the selected top select gate during the program precharge process. A turn-on voltage which is greater than the threshold voltage of the top select gates may be applied during the program process.

In an example, the method may further include applying a bias voltage to selected word lines and applying the second power supply voltage to unselected word lines during the program precharge process.

Still referring to FIG. 10, the bias voltage may be applied to the selected word lines during the program precharge process, and the second power supply voltage may also be applied to the selected word lines during the program precharge process. A program voltage (Vpgrm) may be applied to the selected word lines during the program process. The second power supply voltage may be applied to the unselected word lines during the program precharge process. In order to reduce the programming interference of the unselected word lines to the selected word lines, a pass voltage (Vpass) may be applied to the unselected word lines during the program process.

In addition, for the top dummy layer, the second power supply voltage can be applied during the program precharge process, and a bias voltage (Vbias) can be applied during the program process. For the bottom dummy layer, a high threshold voltage can be applied at the beginning of the program precharge process, the second power supply voltage can be applied at the end of the program precharge process, and the bias voltage can be applied during the program process.

Figure 11:
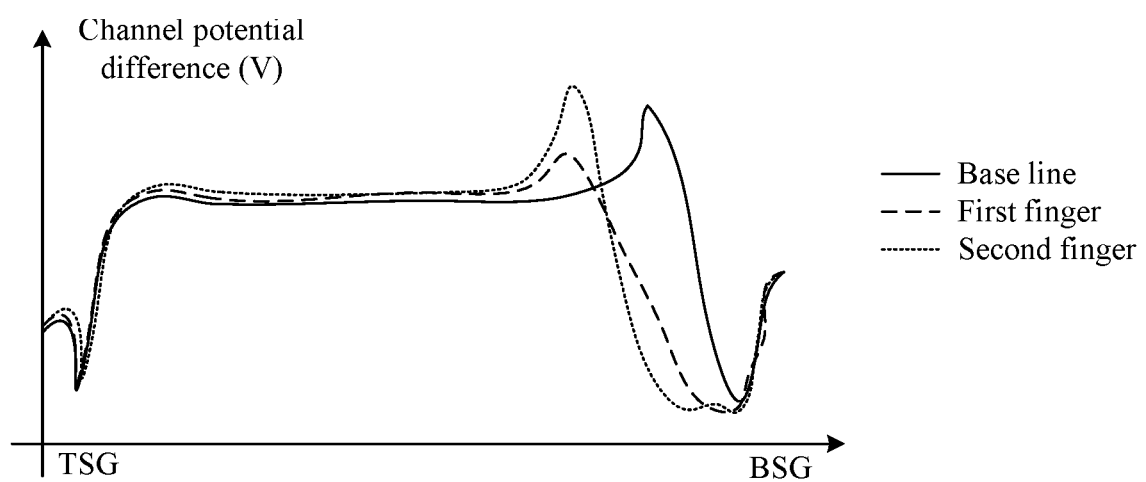
FIG. 11 is a schematic diagram of channel potential difference at a different memory cells, according to an example of the present application.

As shown in FIG. 11, a schematic diagram of the channel potential difference at different memory cells is shown. FIG. 11 shows a schematic diagram of the channel potential difference at different memory cells in the base line without timing turn-off of the bottom select gate, a schematic diagram of the channel potential difference at different memory cells in the first finger, and a schematic diagram of the channel potential difference at different memory cells in the second finger. As can be seen from FIG. 11, compared with the bottom select gate in the base line, the channel potential differences between the bottom select gates in the first finger and the second finger are lower, thereby reducing the remaining electrons in the channel, which can reduce programming interference.

In an example, at S903, the method may include applying the second power supply voltage to the first bottom gate line and applying the third voltage to a top-layer bottom gate line of the second bottom gate line starting at a second moment after the first moment of the program precharge process. Applying the second power supply voltage to the first bottom gate line and the top-layer bottom gate line of the second bottom gate line and applying the third voltage to a bottom-layer bottom gate line of the second bottom gate line starting at a third moment after the second moment of the program precharge process.

Figure 12:
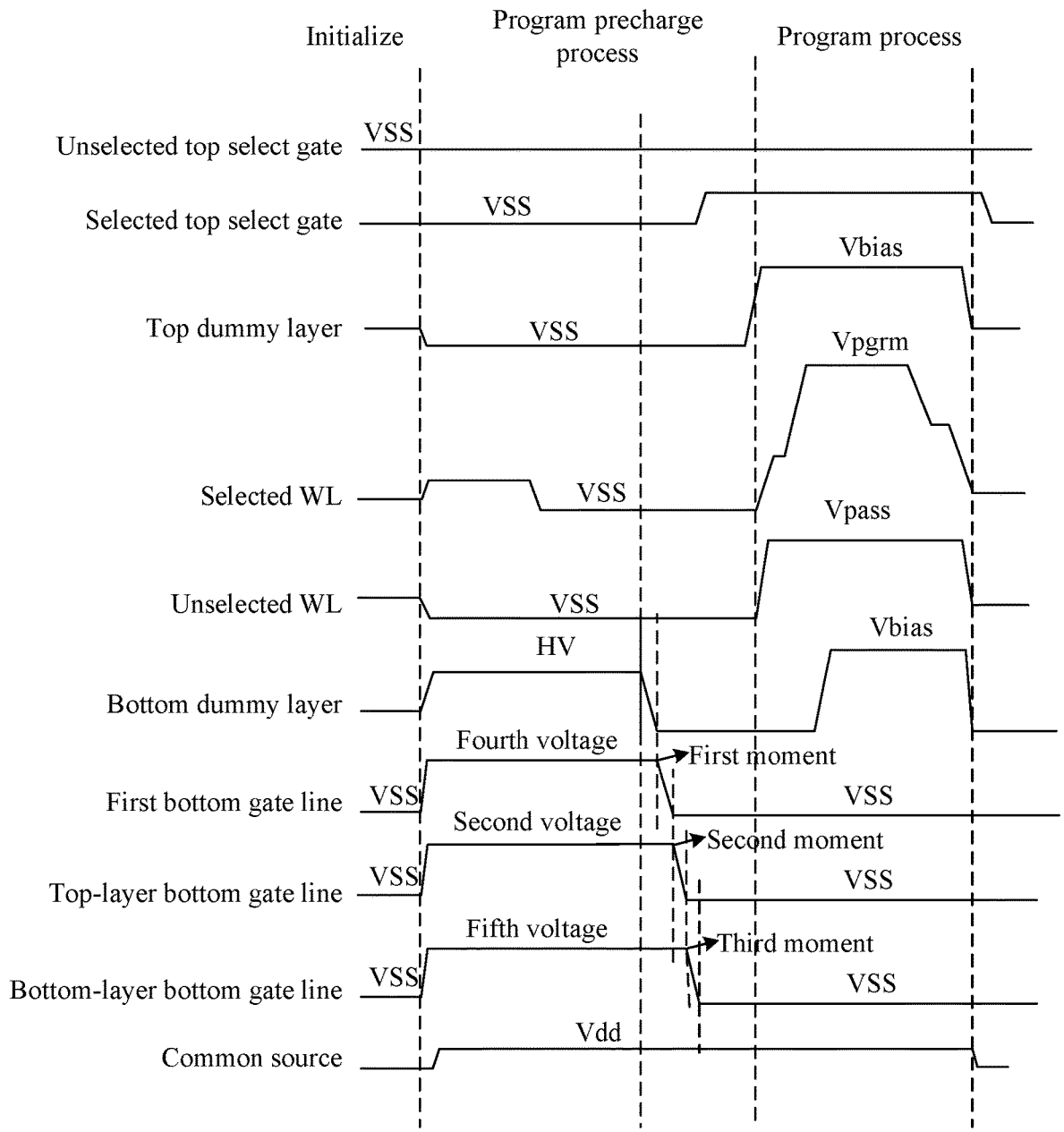
FIG. 12 is a timing diagram of another programming operation of a memory, according to an example of the present application.

For example, as shown in FIG. 12, a timing diagram of another programming operation of a memory is shown. The first power supply voltage can be applied to the common source during the program precharge process and the program process. At the first moment, a first voltage is applied to the first bottom gate line. The first voltage may be less than the first threshold voltage, and the bottom select gate connected to the first bottom gate line starts to be turned off. At this time, a second voltage may be applied to the second bottom gate line, and the second voltage may be greater than the second threshold voltage. Therefore, the bottom select gate connected to the top-layer bottom gate line and the bottom-layer bottom gate line of the second bottom gate line is still in a turn-on state. In this way, the electrons remaining in the channel caused by the turn-off of the bottom select gate connected to the first bottom gate line may be attracted to the common source through the bottom select gate connected to the top-layer bottom gate line and the bottom-layer bottom gate line of the second bottom gate line.

At the second moment, a third voltage is applied to the top-layer bottom gate line, and the third voltage is less than the third threshold voltage, thus the bottom select gate connected to the top-layer bottom gate line starts to be turned off. At this time, the bottom select gate connected to the bottom-layer bottom gate line is still in a turn-on state. Thus, the electrons remaining in the channel caused by the turn-off of the bottom select gate connected to the top-layer bottom gate line may be attracted to the common source through the bottom select gate connected to the bottom-layer bottom gate line. At the third moment, a third voltage is applied to the bottom-layer bottom gate line, and the bottom select gate connected to the bottom-layer bottom gate line starts to be turned off. Thus, the electrons remaining in the channel caused by the turn-off of the bottom select gate connected to the bottom-layer bottom gate line may be attracted to the common source. As a result, the electrons remaining in the channel can be reduced and the programming interference can be reduced.

Additionally, the timing diagram for the unselected top gate line, selected top gate line, selected word line, unselected word line, top dummy layer, and bottom dummy layer is the same as shown in FIG. 10, which will not be described in detail here.

Figure 13:
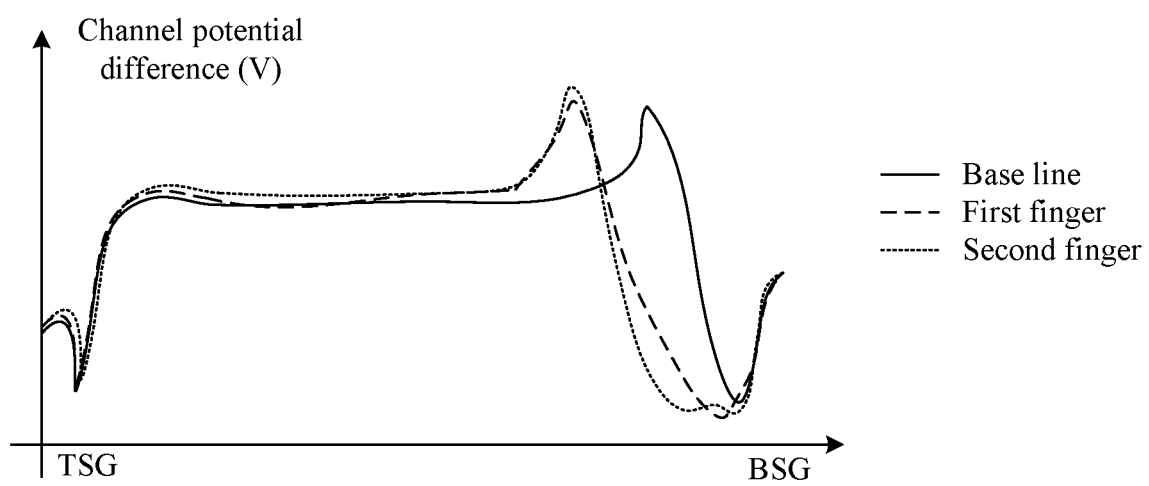
FIG. 13 is a schematic diagram of another channel potential difference at different memory cells, according to an example of the present application.

As shown in FIG. 13, a schematic diagram of the channel potential difference at different memory cells is shown. FIG. 13 shows a schematic diagram of the channel potential difference at different memory cells in the base line without timing turn-off of the bottom select gate, a schematic diagram of the channel potential difference at different memory cells in the first finger, and a schematic diagram of the channel potential difference at different memory cells in the second finger. As can be seen from FIG. 13, compared with the bottom select gate in the base line, the channel potential differences between the bottom select gates in the first finger and the second finger are lower, thereby reducing the remaining electrons in the channel, which can reduce programming interference.

In an example, the method may further include applying a fourth voltage to the first bottom gate line before the first moment of the program precharge process, the fourth voltage being less than the second voltage and greater than a fourth threshold voltage of the bottom select gate connected to the first bottom gate line.

Continuing with reference to FIG. 10, in order to fully turn on the bottom select gate and achieve better program precharge effect, a step voltage can be applied to the first bottom gate line and the second bottom gate line. The fourth threshold voltage may be the maximum threshold voltage of the bottom select gate connected to the first bottom gate line. The fourth voltage is greater than the maximum threshold voltage of the bottom select gate connected to the first bottom gate line, and the second voltage is also greater than the maximum threshold voltage of the bottom select gate connected to the second bottom gate line. That is, the bottom select gates are all in a turn-on state during the program precharge.

In another implementation, reference may be made to FIG. 12. In order to fully turn on the bottom select gate and achieve better program precharge effect, a step voltage may be applied to the first bottom gate line, the top-layer bottom gate line and the bottom-layer bottom gate line. That is, before the first moment of program precharge process, a fourth voltage is applied to the first bottom gate line, a second voltage is applied to the top-layer bottom gate line, and a fifth voltage is applied to the bottom-layer bottom gate line. The fifth voltage may be greater than the second voltage. Therefore, during the program precharge process, the bottom select gates are all in a turn-on state.

In an example, the method may further include applying a first program voltage and a second program voltage to the first bottom gate line before the program precharge process. When applying the first program voltage, a first bottom select gate of a first memory cell string and a first bottom select gate of a second memory cell string connected to the first bottom gate line are programmed to the first threshold voltage.

When applying the second program voltage, the first bottom select gate of the second memory cell string is programmed to a fourth threshold voltage. The first threshold voltage may be less than the fourth threshold voltage. When applying the second program voltage, the method may include applying the first program voltage and the second program voltage to the second bottom gate line. When applying the first program voltage, a second bottom select gate of the first memory cell string and a second bottom select gate of the second memory cell string connected to the second bottom gate line are programmed to the third threshold voltage. When applying the second program voltage, the second bottom select gate of the first memory cell string is programmed to the second threshold voltage. The third threshold voltage may be less than the second threshold voltage.

For example, the first memory string may include memory cell strings connected to BL0-BLn, and the second memory string may include memory cell strings connected to BLn+1-BL2n. The finger may include two memory strings, the first memory string, and the second memory string are located in different fingers, and the finger may include a first finger and a second finger.

The first threshold voltage may be a high threshold voltage, and the fourth threshold voltage may be a low threshold voltage. Taking the memory string shown in FIG. 3 as an example, when the first program voltage is applied to the first bottom gate line, the bottom select gates of str0, str1, str2, and str3 connected to the first bottom gate line are all programmed to a low threshold voltage. When a second program voltage is applied to the first bottom gate line, the bottom select gates of str0 and str1 connected to the first bottom gate line are programmed to a high threshold voltage, where an inhibit voltage may be applied to the bit lines connected to str2 and str3. When the first program voltage is applied to the second bottom gate line, the bottom select gates of str0, str1, str2, and str3 connected to the second bottom gate line are all programmed to a low threshold voltage. When the second program voltage is applied to the second bottom gate line, the bottom select gates of str2 and str3 connected to the second bottom gate line are programmed to a high threshold voltage, where the inhibit voltage may be applied to the bit lines connected to str0 and str1. Therefore, the selective turn-off of different memory strings or fingers can be realized through the combination of the threshold voltages of the bottom select gates of different layers, thereby reducing the loading driven by the peripheral circuit and reducing the programming time.

In addition, a third program voltage may also be applied to the bottom select gate connected to the second bottom gate line. When the third program voltage is applied, the bottom select gates of the first memory cell string and the second memory cell string connected to the second bottom gate line are programmed to a fifth threshold voltage, and the fifth threshold voltage may be a middle threshold voltage.

Some examples of the present disclosure further provide an electronic device. The electronic device may be any one of mobile phones, desktop computers, tablets, notebook computers, servers, vehicle-mounted equipment, wearable devices (such as smart watches, smart bracelets, smart glasses, etc.), mobile power supplies, game consoles, digital multimedia players, and the like The electronic device may include the memory system described above, and may further include at least one of a central processing unit (CPU) or a cache, and the like.

The above are only some examples of the present disclosure, but the protection scope of the present disclosure is not limited thereto. Any changes or substitutions that can be readily contemplated by those skilled in the art within the technical scope disclosed by the present disclosure should be covered by the protection scope of the present disclosure. Therefore, the protection scope of the present disclosure should be subject to the protection scope of the claims.

What is claimed is:

1. A method of operating a memory, comprising:
applying a first power supply voltage to a common source during a program precharge process;
applying a first voltage to a first bottom gate line and applying a second voltage to a second bottom gate line starting at a first moment of the program precharge process, the first voltage being less than a first threshold voltage of a bottom select gate connected to the first bottom gate line, and the second voltage being greater than a second threshold voltage of a bottom select gate connected to the second bottom gate line; and
applying a second power supply voltage to the first bottom gate line and applying a third voltage to the second bottom gate line after the first moment of the program precharge process, the third voltage being less than a third threshold voltage of the bottom select gate connected to the second bottom gate line.

2. The method of claim 1, wherein the applying a second power supply voltage to the first bottom gate line and applying a third voltage to the second bottom gate line after the first moment of the program precharge process comprises:
applying the second power supply voltage to the first bottom gate line and applying the third voltage to a top-layer bottom gate line of the second bottom gate line starting at a second moment after the first moment of the program precharge process; and
applying the second power supply voltage to the first bottom gate line and the top-layer bottom gate line of the second bottom gate line and applying the third voltage to a bottom-layer bottom gate line of the second bottom gate line starting at a third moment after the second moment of the program precharge process.

3. The method of claim 1, further comprising:
applying a fourth voltage to the first bottom gate line before the first moment of the program precharge process, the fourth voltage being less than the second voltage and greater than a fourth threshold voltage of the bottom select gate connected to the first bottom gate line.

4. The method of claim 1, further comprising:
applying a bias voltage to selected word lines and applying the second power supply voltage to unselected word lines during the program precharge process.

5. The method of claim 1, further comprising:
applying a turn-on voltage to a selected top select gate and applying the second power supply voltage to an unselected top select gate during the program precharge process.

6. The method of claim 1, further comprising:
applying a first program voltage and a second program voltage to the first bottom gate line before the program precharge process,
wherein when applying the first program voltage:
a first bottom select gate of a first memory cell string and a first bottom select gate of a second memory cell string connected to the first bottom gate line are programmed to the first threshold voltage, and
wherein when applying the second program voltage:

the first bottom select gate of the second memory cell string is programmed to a fourth threshold voltage, the first threshold voltage being less than the fourth threshold voltage.

7. The method of claim 6, further comprising:
applying the first program voltage and the second program voltage to the second bottom gate line,
wherein when applying the first program voltage:
a second bottom select gate of the first memory cell string and a second bottom select gate of the second memory cell string connected to the second bottom gate line are programmed to the third threshold voltage, and
wherein when applying the second program voltage:
the second bottom select gate of the first memory cell string is programmed to the second threshold voltage, the third threshold voltage being less than the second threshold voltage.

8. The method of claim 7, wherein the first memory cell string and the second memory cell string are located in different fingers.

9. A memory, comprising:
a plurality of memory cell strings, comprising:
a plurality of bottom select gates connected in series, a first bottom select gate of a first memory cell string and a first bottom select gate of a second memory cell string being connected to a first bottom gate line, a second bottom select gate of the first memory cell string and a second bottom select gate of the second memory cell string being connected to a second bottom gate line, and the second bottom select gate being located between the first bottom select gate and a common source; and
a peripheral circuit configured to:
apply a first power supply voltage to the common source during a program precharge process;
apply a first voltage to the first bottom gate line and apply a second voltage to the second bottom gate line starting at a first moment of the program precharge process, the first voltage being less than a first threshold voltage of the bottom select gate connected to the first bottom gate line, and the second voltage being greater than a second threshold voltage of the bottom select gate connected to the second bottom gate line; and
apply a second power supply voltage to the first bottom gate line and apply a third voltage to the second bottom gate line after the first moment of the program precharge process, the third voltage being less than a third threshold voltage of the bottom select gate connected to the second bottom gate line.

10. The memory of claim 9, wherein:
the second bottom gate line comprises a top-layer bottom gate line and a bottom-layer bottom gate line, and
the peripheral circuit is further configured to:
apply the second power supply voltage to the first bottom gate line and apply the third voltage to the top-layer bottom gate line of the second bottom gate line starting at a second moment after the first moment of the program precharge process; and
apply the second power supply voltage to the first bottom gate line and the top-layer bottom gate line of the second bottom gate line and apply the third voltage to the bottom-layer bottom gate line of the second bottom gate line starting at a third moment after the second moment of the program precharge process.

11. The memory of claim 9, wherein the peripheral circuit is further configured to:
  apply a fourth voltage to the first bottom gate line before the first moment of the program precharge process, the fourth voltage being less than the second voltage and greater than a fourth threshold voltage of the bottom select gate connected to the first bottom gate line.

12. The memory of claim 9, wherein the peripheral circuit is further configured to:
  apply a bias voltage to selected word lines and apply the second power supply voltage to unselected word lines during the program precharge process.

13. The memory of claim 9, wherein the peripheral circuit is further configured to:
  apply a turn-on voltage to a selected top select gate and apply the second power supply voltage to an unselected top select gate during the program precharge process.

14. The memory of claim 9, wherein the peripheral circuit is further configured to:
  apply a first program voltage and a second program voltage to the first bottom gate line before the program precharge process,
  wherein when applying the first program voltage:
    the first bottom select gate of the first memory cell string and the first bottom select gate of the second memory cell string connected to the first bottom gate line are programmed to the first threshold voltage, and
  wherein when applying the second program voltage:
    the first bottom select gate of the second memory cell string is programmed to a fourth threshold voltage, the first threshold voltage being less than the fourth threshold voltage.

15. The memory of claim 14, wherein the peripheral circuit is further configured to:
  apply the first program voltage and the second program voltage to the second bottom gate line,
  wherein when applying the first program voltage:
    the second bottom select gate of the first memory cell string and the second bottom select gate of the second memory cell string connected to the second bottom gate line are programmed to the third threshold voltage, and
  wherein when applying the second program voltage:
    the second bottom select gate of the first memory cell string is programmed to the second threshold voltage, the third threshold voltage being less than the second threshold voltage.

16. The memory of claim 15, wherein the first memory cell string and the second memory cell string are located in different fingers.

17. A memory system, comprising:
  one or more memories, each comprising:
    a plurality of memory cell strings, comprising:
      a plurality of bottom select gates connected in series, a first bottom select gate of a first memory cell string and a first bottom select gate of a second memory cell string being connected to a first bottom gate line, a second bottom select gate of the first memory cell string and a second bottom select gate of the second memory cell string being connected to a second bottom gate line, and the second bottom select gate being located between the first bottom select gate and a common source; and
    a peripheral circuit configured to:
      apply a first power supply voltage to the common source during a program precharge process;
      apply a first voltage to the first bottom gate line and apply a second voltage to the second bottom gate line starting at a first moment of the program precharge process, the first voltage being less than a first threshold voltage of the bottom select gate connected to the first bottom gate line, and the second voltage being greater than a second threshold voltage of the bottom select gate connected to the second bottom gate line; and
      apply a second power supply voltage to the first bottom gate line and apply a third voltage to the second bottom gate line after the first moment of the program precharge process, the third voltage being less than a third threshold voltage of the bottom select gate connected to the second bottom gate line; and
  a memory controller coupled to the memories and configured to control the memories.

* * * * *